US00RE44676E

(19) United States
(12) Reissued Patent
Lee

(10) Patent Number: US RE44,676 E
(45) Date of Reissued Patent: Dec. 31, 2013

(54) FOOD GARBAGE DISPOSER

(71) Applicants: Myeong-Ryul Lee, Siheung-si (KR); Enic Co., Ltd., Siheung-si (KR)

(72) Inventor: Myeong-Ryul Lee, Siheung-si (KR)

(73) Assignees: Myeong-Ryul Lee, Siheung-si, Gyeonggi-do (KR); ENIC Co., Ltd., Siheung-si, Gyeonggi-do (KR)

(21) Appl. No.: 13/708,896

(22) Filed: Dec. 7, 2012

Related U.S. Patent Documents

Reissue of:

(64) Patent No.: 7,845,586
Issued: Dec. 7, 2010
Appl. No.: 12/118,287
Filed: May 9, 2008

(51) Int. Cl.
*B02C 17/00* (2006.01)
*B02C 19/00* (2006.01)

(52) U.S. Cl.
USPC . 241/65; 241/101.2; 241/101.8; 241/DIG. 38

(58) Field of Classification Search
USPC ..... 241/65, 101.2, 101.8, 301, DIG. 38; 422/309
See application file for complete search history.

(56) References Cited

U.S. PATENT DOCUMENTS 5,167,372 A * 12/1992 Poggie et al. ..... 241/23
5,980,823 A * 11/1999 Nekozuka et al. ..... 422/4
7,431,229 B2 * 10/2008 Gali ..... 241/24.14

* cited by examiner

*Primary Examiner* — Faye Francis
(74) *Attorney, Agent, or Firm* — Christie, Parker & Hale, LLP

(57) ABSTRACT

Disclosed herein is a food garbage disposer including: a reaction vessel which includes a hopper into which food garbage is introduced, a heating tank filled with heat-medium oil to heat the hopper, and at least one heater to heat the heat-medium oil in the hopper; an automatic filter which includes an automatic injection nozzle and filters vapor discharged from the reaction vessel; a condenser which condenses the vapor passed through the automatic filter and separate the vapor into condensed water and air; a condensed-water purifier which purifies the condensed water produced by the condenser and supplies the purified water to the automatic injection nozzle of the automatic filter; a deodorizer which purifies and deodorizes the air produced by the condenser; and an air circulation adjuster which mixes the air passed through the deodorizer with external air and reintroduces the mixed water into the reaction vessel. With this configuration, the food garbage disposer is improved in not only preventing an offensive odor from generating since the condensed water produced in the condenser is utilized for filtering the vapor discharged out of the reaction vessel, but also automating a full operation thereof since temperature of the reaction vessel is automatically controlled to facilitate drying and decomposition of the food garbage.

20 Claims, 6 Drawing Sheets

FOOD GARBAGE DISPOSER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a food garbage disposer, and more particularly, to a food garbage disposer improved in not only preventing an offensive odor from generating since condensed water produced in a condenser can be utilized for filtering vapor discharged out of a reaction vessel, but also automating a full operation thereof since temperature of the reaction vessel is automatically controlled to facilitate drying and decomposition of food garbage.

2. Description of the Related Art

In general, a conventional food garbage disposer simply dries food garbage using a heating means such as a heater, etc., or dehydrates the food garbage through compression or the like and dries it using hot air without changing its shape when the food garbage is introduced into a storage space. Further, air discharge is connected to a drainpipe or the outside without undergoing separate deodorization, thereby causing secondary pollution or an offensive odor.

The heating means heats and dries the food garbage during an operating time typically set by a timer or the like. However, in such a conventional heating-and-drying type food garbage disposer that merely dries the food garbage by heating and cutting to thereby reduce the weight and the volume of the food garbage, the timer of setting the operating time is not enough to fully automate the food garbage disposer.

That is, the operating time is manually set using the timer, so that it cannot reflect a drying time considering the amount, the kind, and a water-contained state of food garbage. Thus, if the food garbage is not completely dried, the timer has to be set again to perform additional drying. Further, air discharged from a reaction vessel does not undergo deodorization, thereby causing an offensive odor.

On the other hand, even if the drying of the food garbage is already completed within the setting time, the heating means may still operate until the setting time is over, thereby wastefully consuming energy.

To overcome the foregoing problems, the inventor of the present invention disclosed the food garbage disposers in Korean Patent Registration Nos. 0686957 and 0613663.

Referring to these registration inventions, the food garbage disposer includes a reaction vessel to heat and dry the food garbage, a condenser to cool and separate vapor discharged from the reaction vessel into water and air, a blower to transfer the separated air to a deodorizer, the deodorizer to deodorize the transferred air, and an air circulation adjusting pipe to mix the deodorant air with external air and return it to the reaction vessel. The reaction vessel is provided with a stirrer to stir the food garbage and assist decomposition and drying of the food garbage. Further, the reaction vessel is heated by heat-medium oil in a heat-medium oil tank attached to a bottom of the reaction vessel.

In the registration inventions proposed to solve the above-described problems, the whole system including the reaction vessel is controlled to operate according to a preset temperature and an interior temperature change of the reaction vessel in which the food garbage is put and heated, and the heat-medium oil is additionally reheated with waste heat generated by a heat supplying pipe attached to the deodorizer, thereby providing the food garbage disposer that perfectly treats the food garbage irrespective of the amount and characteristics of the food garbage while reducing energy consumption.

Thus, the registration inventions remarkably solve the foregoing problems but still have problems as follows.

First, pipes of the condenser, the blower or the deodorizer are clogged with dust, i.e., byproducts produced in the reaction vessel while decomposing the food garbage, so that the food garbage disposer stops or malfunctions.

Second, a silicon oil-seal used in a join between the stirrer and the reaction vessel gets worn out by long-time rotation of a stirring shaft, the byproducts, etc. as time goes by, so that a leakage damages a bearing. The damaged bearing causes the food garbage disposer to get out of order or the byproduct to leak.

Third, the air circulation adjusting pipe has to be adjusted to a maximum external air influx ratio, but the vapor may flow backward and the waste heat may not be used again. Therefore, the continuous circulation decreases the efficiency of the operation.

Fourth, efficiency of separating the vapor containing much water into condensed water and condensed air in the condenser is low, so that the deodorizer and the reaction vessel decrease in efficiency, thereby delaying the operating time of the food garbage disposer.

SUMMARY OF THE INVENTION

The present invention is conceived to solve the problems of the conventional techniques as described above, an aspect of which is to provide a food garbage disposer improved in not only preventing an offensive odor from generating since condensed water produced in a condenser is utilized for filtering vapor discharged out of a reaction vessel, but also automating a full operation thereof since temperature of the reaction vessel is automatically controlled to facilitate drying and decomposition of food garbage.

In accordance with one aspect of the present invention, the above and other aspects can be accomplished by the provision of A food garbage disposer including: a reaction vessel which includes a hopper into which food garbage is introduced, a heating tank filed with heat-medium oil to heat the hopper, and at least one heater to heat the heat-medium oil in the hopper; an automatic filter which includes an automatic injection nozzle and filters vapor discharged from the reaction vessel; a condenser which condenses the vapor passed through the automatic filter and separate the vapor into condensed water and air; a condensed-water purifier which purifies the condensed water produced by the condenser and supplies the purified water to the automatic injection nozzle of the automatic filter; a deodorizer which purifies and deodorizes the air produced by the condenser; and an air circulation adjuster which mixes the air passed through the deodorizer with external air and reintroduces the mixed water into the reaction vessel.

The food garbage disposer may further include a controller which controls the heater according to a temperature change inside the hopper so that temperature of the heat-medium oil is adjusted to facilitate drying and decomposition of the food garbage.

The reaction vessel may include a hopper temperature sensor to sense temperature inside the hopper; and a heat-medium oil temperature sensor to sense temperature of the heat-medium oil.

The deodorizer may include a heat supply tube and a catalyst tube, the heat supply tube being mounted while penetrating the heating tank.

The condenser may include a plurality of cooling pipes and at least one cooling fan to cool the plurality of cooling pipes.

The cooling pipe may include at least one lattice contact mesh placed therein, and a coil-shaped aluminum pin attached to an outer circumference thereof.

The food garbage disposer may further include a rotary stirring impeller placed inside the hopper of the reaction vessel and stirring the food garbage.

The stirring impeller may include an impeller shaft having one end coupled to a lateral wall of the hopper, and the one end of the impeller shaft is coupled to the lateral wall of the hopper by a plurality of gland packings and a packing cover allowing the gland packing to be adjusted with an adjusting bolt.

The one end of the impeller shaft may be provided with an oil-seal to prevent a leakage that may leak from the hopper from being introduced into a bearing for allowing the impeller shaft to rotate, and a falling hole to make the leakage fall down to prevent the leakage from reaching the bearing.

The air circulation adjuster may include: a rotary wing which is perpendicularly attached to assist air circulation; a check valve which is placed above the rotary wing and prevents the vapor produced in the reaction vessel from flowing backward; a rotation guide structure which reintroduces the air produced from the deodorizer into the reaction vessel; an inhale/exhaust pipe which is coupled to a bottom of the air circulation adjuster and through which air is inhaled and exhausted; and an air purifying filter which is detachably coupled to an end part of the inhale/exhaust pipe.

The automatic filter may includes: a filtering box through which the vapor discharged from the reaction vessel passes; a filter which filters the vapor passed through the filtering box; and a gear pump which is provided for injecting the condensed water through the automatic injection nozzle.

The condensed-water purifier may include: a condensed-water storage tank to store the condensed water produced by the condenser; a drainpipe to drain out the condensed water produced by the condenser to the condensed-water storage tank; and a condensed-water filter layer to filter the condensed water.

The condensed-water purifier may further include an auxiliary tank to store a predetermined amount of condensed water passed through the condensed-water filter layer.

The condensed-water purifier may further include a discharge pipe that communicates with the auxiliary tank so that the condensed water stored in the auxiliary tank is partially discharged to an outside when water in the auxiliary tank 530 is beyond a predetermined level.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE INVENTION

Hereinafter, the invention will be described more fully with reference to the accompanying drawings, in which like numerals refer to like elements. This invention may, however, be embodied in many different forms and should not be construed as limited to the exemplary embodiments set forth herein.

Figure 1:
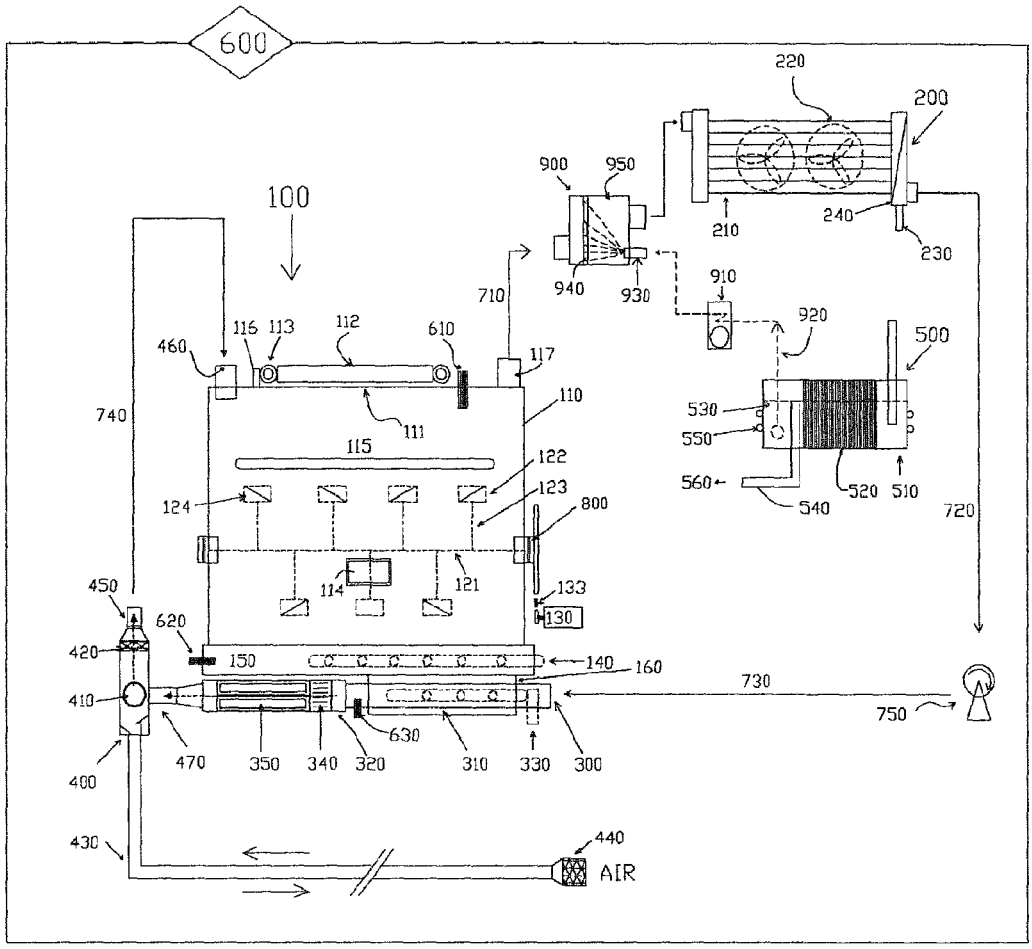
FIG. 1 illustrates a food garbage disposer according to an embodiment of the present invention.

Referring to FIG. 1, a food garbage disposer according to an embodiment of the present invention includes a reaction vessel 100 having a driver 130 and a heating tank 160, an automatic filter 900, a condenser 200, a condensed-water purifier 500, a blower 750, a deodorizer 300, an air circulation adjuster 400, and a controller 600 controlling a total system.

Below, a detailed configuration of each element will be described with reference to accompanying drawings.

Figure 2A:
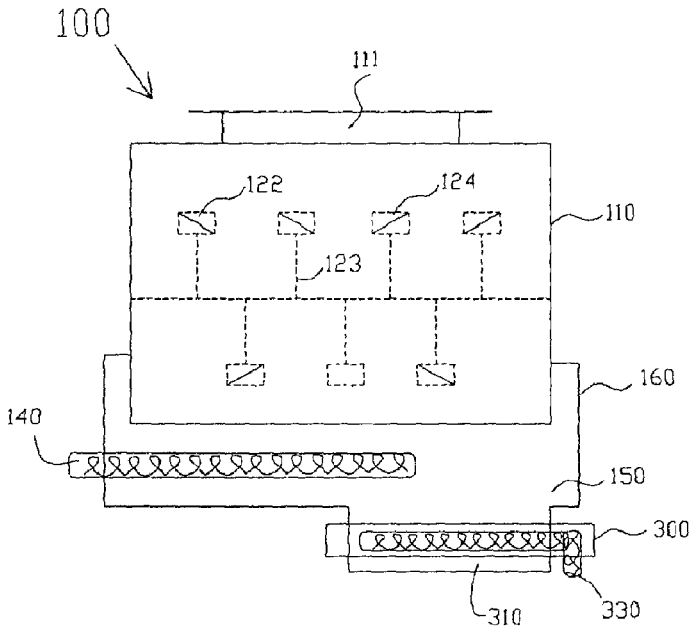
FIG. 2A is a front sectional view of a reaction chamber in the food garbage disposer according to an embodiment of the present invention.
Figure 2B:
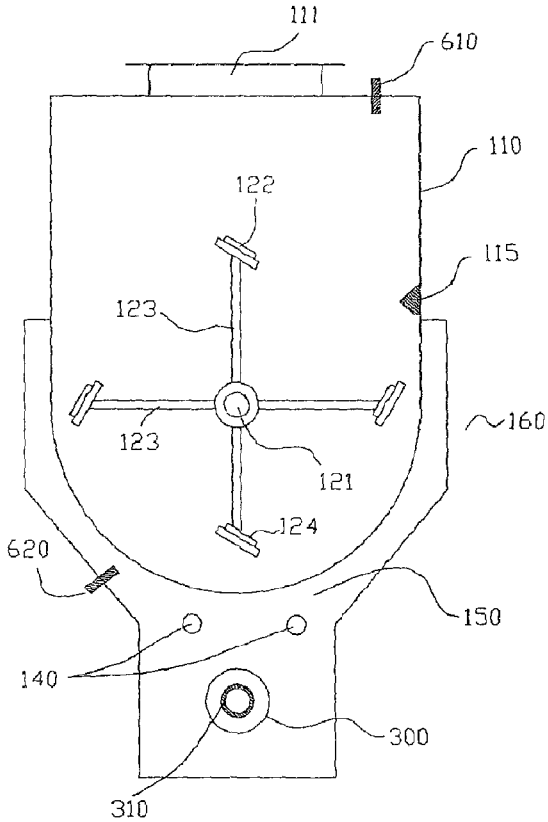
FIG. 2B is a lateral sectional view of the reaction chamber in the food garbage disposer according to an embodiment of the present invention.
Figure 5A:
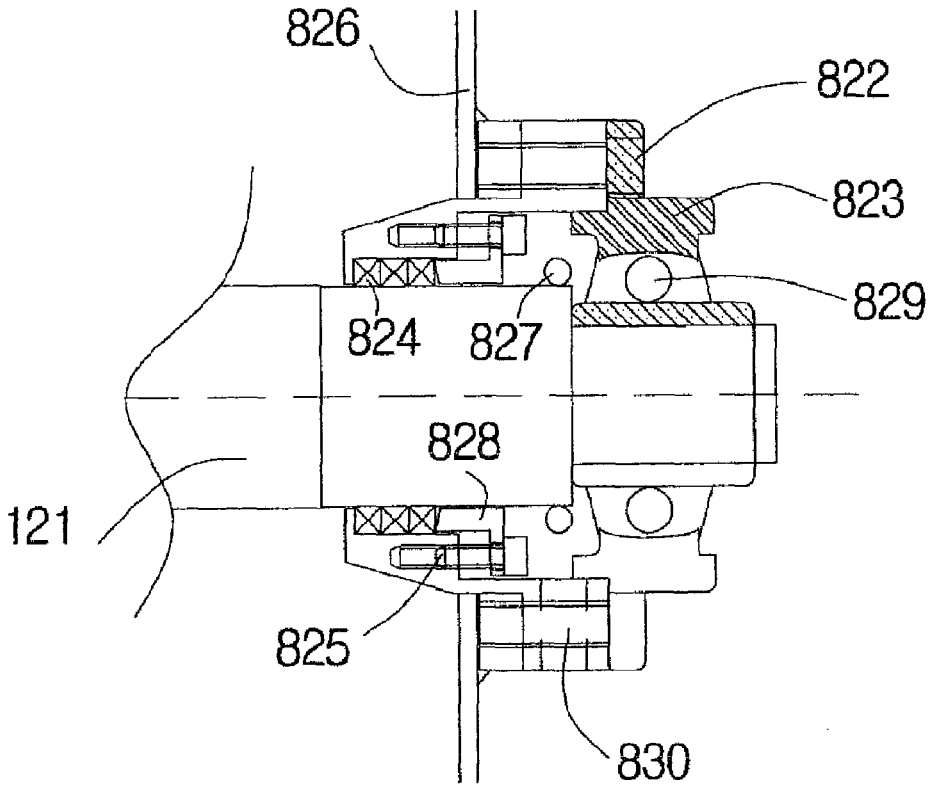
FIG. 5A is a sectional view of a joint between an impeller and a hopper in the food garbage disposer according to an embodiment of the present invention.
Figure 5B:
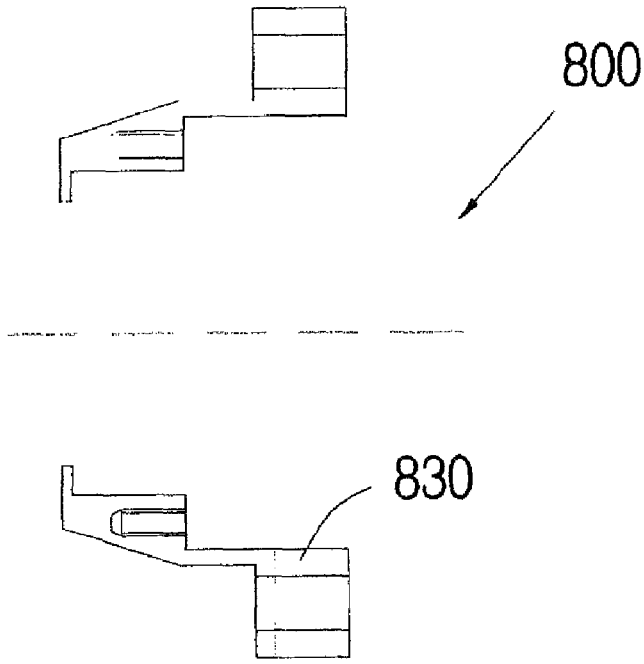
FIG. 5B is a sectional view showing a left side of a housing structure in the food garbage disposer according to an embodiment of the present invention.
Figure 5C:
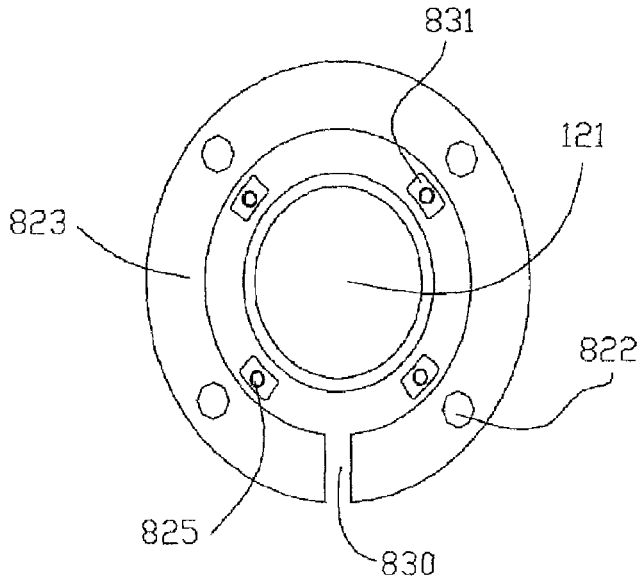
FIG. 5C is a sectional view showing a right side of a housing structure in the food garbage disposer according to an embodiment of the present invention.

Referring to FIGS. 2A and 2B, the reaction vessel 100 includes an inlet 111 through which food garbage is introduced, a hopper 110 to be filled with the food garbage, a stirring impeller 120 to stir the food garbage in the hopper 110, the heating tank 160 filed with heat-medium oil 150 to supply heat to the food garbage in the hopper 110, a plurality of heaters 140 for heating the heat-medium oil 150, an outlet 114 through which dried and decomposed byproducts are discharged when operation is completed. The inlet 111 includes a door 112, a plurality of opening/closing cylinders 113 to open and close the door 112, and a safety sensor 116 to generate an operation stopping signal when the door 112 is opened. As shown in FIG. 2B, the stirring impeller 120 includes an impeller shaft 121, a plurality of stirring wing rods 123, a stirring wing 122, and an inclined piece 124. Further, as shown in FIGS. 5A and 5B, various elements are provided for coupling the impeller shaft 121 to a side of the hopper 110, and a driving motor 130 is provided to drive the stirring impeller 120.

Figure 4:
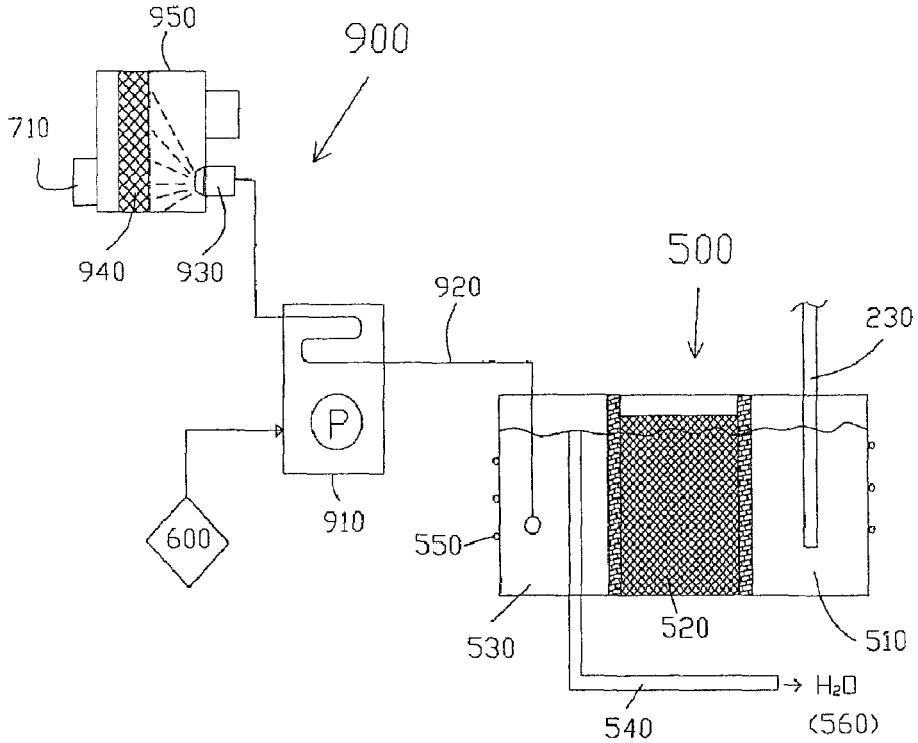
FIG. 4 shows parts of an automatic filter in the food garbage disposer according to an embodiment of the present invention.

The automatic filter 900 is connected to a vapor outlet pipe 117 through which water vapor generated in the hopper 110 of the reaction vessel 100 is discharged, and, as shown in FIG. 4, includes a filtering box 950, a filter 940 provided in the filtering box 950, and an automatic injection nozzle 930 for cleaning the filter 940. The filter 940 includes a plurality of compact metal meshes for filtering dust generated in drying and decomposing processes of the reaction vessel 100, but not limited thereto. The automatic injection nozzle 930 injects condensed water generated by the condenser 200 and supplied by a gear pump 910, and the condensed water injected through the automatic injection nozzle 930 is used for cleaning the filter 940.

Figure 7:
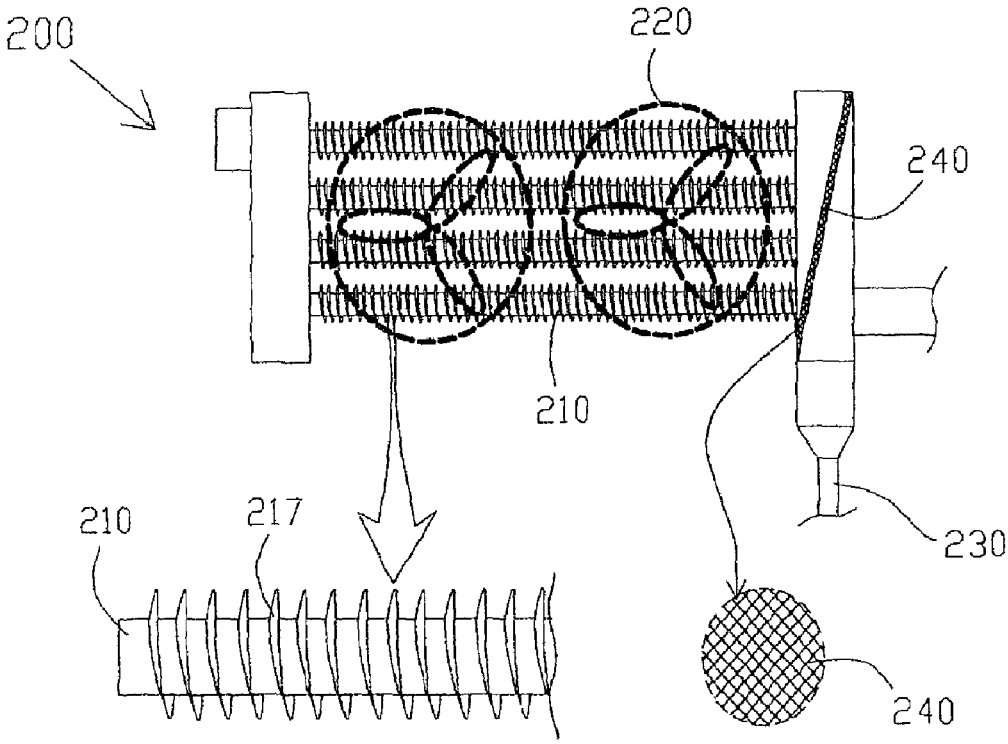
FIG. 7 illustrates a condenser and its structure in the food garbage disposer according to an embodiment of the present invention.

The condenser 200, as shown in FIG. 7, includes a plurality of cooling pipes 210 through which the water vapor passes, a plurality of cooling fans 220 to air-cool the cooling pipes 210, a plurality of lattice contact meshes 240 for maximizing condensation inside the cooling pipe 210, and a coil-shaped aluminum pin 217 increasing a thermal contact area on an outer circumference of the cooling pipe 210 and enhancing cooling efficiency.

The condensed-water purifier 500, as shown in FIG. 4, includes a condensed-water storage tank 510 to store the condensed water, a drainpipe 230 to move the condensed water generated in the condenser 200, a condensed-water filter layer 520 to purify the condensed water, a discharge pipe 540 to discharge the condensed water to the outside, a hot wire 550 to prevent freezing, and an auxiliary tank 530 to store a predetermined amount of condensed water purified through the condensed-water filter layer 520. Here, the discharge pipe 540 communicates with the auxiliary tank 530, so that water 560 stored in the auxiliary tank 530 can be discharged little by little to the outside therethrough when water in the auxiliary tank 530 is beyond a preset level.

The deodorizer 300, as shown in FIG. 1, includes a heat supply tube 310 and a catalyst tube 320. The heat supply tube 310 includes an air heater 330, and the catalyst tube 320 includes a reaction catalyst 350 and a pre-treating material 340.

Figure 6:
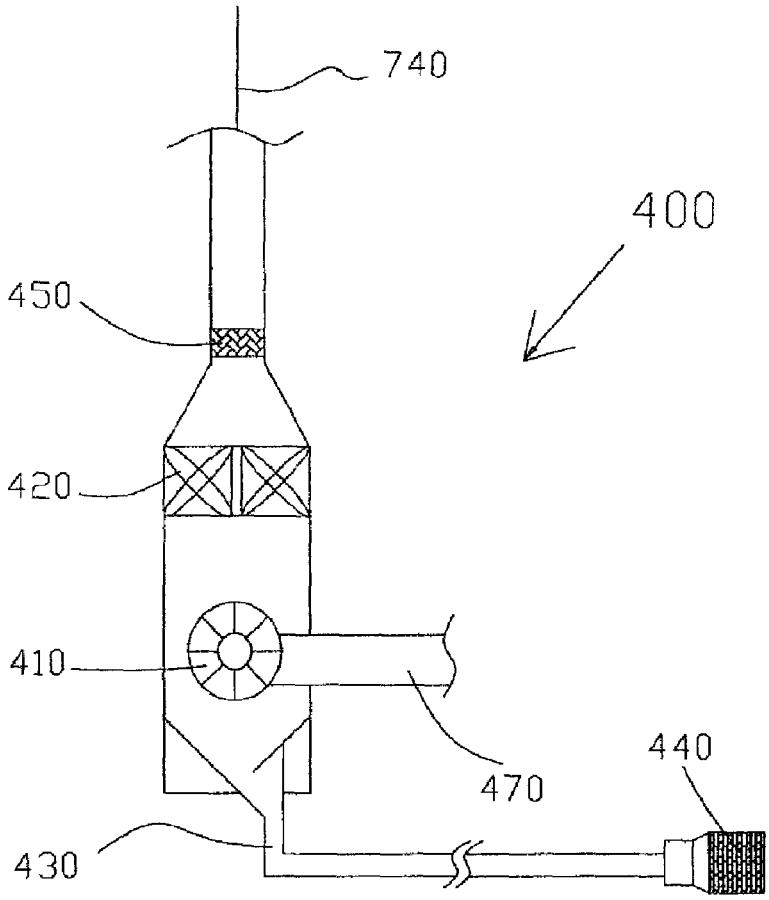
FIG. 6 illustrates an air circulation adjuster in the food garbage disposer according to an embodiment of the present invention.

The air circulation adjuster 400, as shown in FIG. 6, includes a perpendicular rotary wing 420, a check valve 450 placed above the rotary wing 420, a rotation guide structure 410 placed in the center thereof, an inhale/exhaust pipe 430 coupled to a bottom thereof to inhale and exhaust air, and an air purifying filter 440 detachably coupled to an end part of the inhale/exhaust pipe 430.

Below, operations and structures of the foregoing elements will be described in detail.

As shown in FIG. 2B, the food garbage is introduced into the inlet 111 of the hopper 110, and the door 112 is closed by the opening/closing cylinder 113, thereby enabling the food garbage disposer to start operation. At this time, the safety sensor 116 senses whether the door 112 is correctly closed, and sends the controller 600 an operation-start signal.

When the operation starts, the plurality of heaters 140 in the heating tank 160 operates and increases temperature of the heat-medium oil 150. Then, the stirring impeller 120 rotates with the driving motor 130 and a chain 133 placed outside the hopper 110. Further, the heated heat-medium oil 150 increases the temperature of the food garbage in the hopper 110, so that the food garbage is decomposed and dried while generating a large quantity of vapor.

The impeller shaft 121 of the stirring impeller 120 rotates the plurality of stirring wings 122, thereby facilitating the drying and the decomposition of the food garbage. Further, the stirring wing rods 123 are symmetrically arranged to prevent the food garbage from gathering in one side. Meanwhile, if the food garbage is larger than a proper size, it is crushed to be smaller for the proper size by the stirring wing 122 being rotated and a crushing blade 115 fastened to an inner wall of the hopper 100, thereby further facilitating the drying and the decomposition.

The stirring wing 122 is attached to the stirring wing rod 123 at an angle of about 45° C. to minimize load of the operation. Further, the inclined piece 124 is attached to a rear of the stirring wing 122, and gathers the byproducts toward the outlet 114 when the operation is completed and the stirring impeller 120 rotates in a reverse direction to discharge the byproducts to the outside.

As shown in FIGS. 5A and 5B, a sealing structure between the impeller shaft 121 of the stirring impeller 120 and the hopper 110, i.e., between the impeller shaft 121 and a housing structure 800 formed at a lateral plate 826 of the hopper 110 has to be strengthened to prevent a leakage of the hopper 110 while the food garbage containing much water is dried and decomposed. Such a sealing structure is likely to damage due to water, heat, or friction with dried byproducts. For example, if a bearing 829 integrally fastened for rotating the impeller shaft 121 is damaged, the stirring impeller 120 may be stopped or the treating food garbage may leak, thereby causing an abnormal operation.

The existing seal structure generally uses an oil-seal provided integrally with a ball-bearing. However, the oil-seal made of silicon easily gets worn out by interference with the treating food garbage or the like, and thus the treating food garbage has a direct effect on the bearing 829, thereby damaging the bearing 829. If the operation is performed with the damaged bearing 829, the impeller shaft 121 is damaged and stopped. Thus, the existing seal structure has a defect in durability.

Accordingly, according to an embodiment of the present invention, a plurality of gland packings 824 are added to the impeller shaft 121 using the existing silicon oil-seal and the housing structure 800 provided in the lateral plate 826. Further, a packing cover 828 is provided to adjust the plurality of gland packings 824 with an adjusting bolt 825 through a bolt groove 831, so that the gland packing 824 is prevented from loosening and easily repaired by adjusting the adjusting bolt 825 through the bolt groove 831 when there is leakage. In this embodiment, there is provided spaces to which 4-5 lines of the gland packings 824 are mounted. Further, to prevent water or a foreign material containing salt from leaking and reaching the bearing 829, a falling hole 830 is formed on a bottom of the housing structure 800 and an O-ring 827 is mounted to the impeller shaft 121. Therefore, even though an introduced foreign material is small, it falls down. Also, although the impeller shaft 121 is bent by the load, the bearing 829 is not damaged, thereby securing the highest durability. Here, the housing structure 800 is equivalently applied to opposite ends of the impeller shaft 121.

In the present embodiment, the heater 140 has a two-line structure of a pipe heater, which increases the temperature of the heat-medium oil 150 and indirectly supplies heat to the hopper 110, thereby performing the drying and the decomposition. The hopper 110 and the heater 140 are provided with temperature sensors 610 and 620, respectively, so that their temperatures can be properly controlled. Further, to prevent overheat due to a malfunction of the controller, a safety controller (not shown) is provided to short-circuit the two-line heaters 140 and cut off electricity when the temperature is higher than a predetermined temperature. Here, the heaters 140 are installed in the two-lines, but the number of heaters 140 is not limited thereto. Alternatively, one or more heaters may be provided as necessary.

The water vapor generated in the hopper 110 is transferred to the automatic filter 900 through the vapor outlet pipe 117 along a first connection pipe 710. After a lapse of a predetermined time, much dust is generated by rotation of the stirring impeller 120 and air circulation of the blower 750 when the food garbage in the hopper 110 decreases in water content and reaches completion as being dried and decomposed. At every operation, the dust is circulated together with the water vapor along circulation pipes through the vapor outlet pipe 117, so that the blower 750 may get out of order or the lifespan of the deodorizer 300 may be shortened. Thus, the operating efficiency is considerably lowered, and severely the pipe may be clogged, thereby stopping the operation and causing the malfunction.

Accordingly, in this embodiment as shown in FIG. 4, the automatic filter 900 is mounted to the first connection pipe 710 communicating with the vapor outlet pipe 117 placed in an upper part of the hopper 110. The automatic filter 900 includes the filtering box 950, the filter 940 provided in the filtering box 950 and including the plurality of metal meshes, the automatic injection nozzle 930 attached to one inner side of the filtering box 950, and the gear pump 910. In the filter 940, the minute lattice metal meshes are arranged in plural lines at regular intervals. Thus, the dust introduced from the first connection pipe 117 of the previous process and attached to the filter 940 is automatically back-flushed by the condensed water stored in and injected from the auxiliary tank 530 of the condensed-water purifier 500, thereby decreasing a trouble or a clog due to the dust.

If the food garbage is continuously treated, there may be a problem the filter is clogged and thus the vapor is not smoothly circulated. Thus, the longer the food garbage disposer operates, the lower the efficiency of the operation gets. According to an embodiment of the present invention, the condensed water purified by the condensed-water purifier 500 is recycled in cleaning the filter 940, thereby solving the foregoing problem. On the other hand, in the case of a conventional filter, a filter mesh has to be periodically cleaned by a manual control. If the filter mesh of the conventional filter is not cleaned, the food garbage is not completely treated or the operating time is prolonged since the circulation pipe is clogged.

According to an embodiment of the present invention, the automatic injection nozzle 930 and the gear pump 910 are provided for solving these problems, which are configured to operate for a certain time preset at an operation start time of the food garbage disposer. The gear pump 910 pumps up the condensed water produced in the condenser 200 and stored in the auxiliary tank 530, and the automatic injection nozzle 930 injects the condensed water to the filter 940 to flush the filter 940, thereby preventing the filter 940 from clogging and facilitating the smooth discharge of the vapor. Meanwhile, even if the decomposition is slowly or not smoothly performed due to insufficient water when raw or dry garbage is treated, much vapor may be produced from water injected to the filter 940, thereby facilitating the decomposition of the wet or dry garbage.

The vapor passed through the automatic filter 900 is introduced into the condenser 200, and the introduced vapor passes through the cooling pipe 210. The cooling pipe 210 is provided with the plurality of cooling fans 220 at one side thereof, and air-cools the vapor, so that the vapor can be separated into the condensed water and air by the air-cooling condensation. For efficient heat-radiation, the cooling pipe 210 includes a plurality of metal pipes, and an outer surface of the cooling pipe 210 is formed with the coil-shaped aluminum pins 217. Further, the plurality of lattice contact meshes 240 is provided at the end of the cooling pipe 210, thereby maximizing the condensation.

The condensed water is introduced into the condensed-water purifier 500 via the drain pipe 230. The drain pipe 230 has an over-flow structure so that it is soaked in the condensed water to prevent external air from being inhaled. In the condensed-water purifier 500, the condensed-water filter layer 520 containing active carbon is provided in the middle of the condensed-water storage tank 510. Water purified as being passed through the condensed-water filter layer 520 is stored in the auxiliary tank 530 and flows out little by little to the outside through the discharge pipe 540. Further, the condensed water purified and stored in the auxiliary tank 530 is pumped up by the gear pump 910 and utilized as a water source of the automatic filter 900.

As shown in FIG. 1, the blower 750 is provided on a second connection pipe 720 so as to forcibly transfer the air passed through the condenser 200 to the deodorizer 300. Thus, the air is sent to the deodorizer 300 by the blower 750. The deodorizer 300 includes the heat supply tube 310 and the catalyst tube 320. Further, the air heater 330 is mounted to the heat supply tube 310, and the pre-treating material 340 and the reaction catalyst 350 are inserted in the catalyst tube 320.

The heat supply tube 310 of the deodorizer 300 is mounted to penetrate the heating tank 160 of the reaction vessel 100, so that the heat-medium oil 150 is additionally heated with the waste heat generated by the heat supply tube 310. While passing through the deodorizer 300, the air is primarily deodorized by a high temperature of the heat supply tube 310 and secondarily deodorized by the catalyst tube 320, thereby removing the remaining odor.

The air passed through the deodorizer 300 is mixed with external air in the air circulation adjuster 400 and reintroduced into the hopper 110 of the reaction vessel 100. The air circulation adjuster 400 adjusts a ratio of the deodorized air to the external air in consideration of the amount and the pressure of vapor generated in the hopper 110, thereby automatically adjusting the amount of the external air to be introduced. The air circulation adjuster 400 has a T-shaped cross-section. The air circulation adjuster 400 is placed in front of an air inlet pipe 460 inserted in the hopper 110. The air inlet pipe has a diameter corresponding to about 70% of that of the vapor outlet pipe 117 so as to satisfy speed of inhaled air and other reaction conditions. Further, the perpendicular rotary wing 420 using a whirlwind principle is attached at a predetermined angle to a top of the air circulation adjuster 400 having a cylindrical shape. Between an upper part of the rotary wing 420 and the air inlet pipe 460 is attached the check valve 450 to prevent the vapor generated inside the hopper 110 from flowing backward, thereby allowing the air to flow only toward the hopper 110. The rotary wing 420 serves to smoothly supply the external air and circulate air in the circulation pipe.

In the center of the air circulation adjuster 400, the rotation guide structure 410 is connected to a guide pipe 470 of the deodorizer 300. The rotation guide structure 410 is provided for adjusting load of air introduced through the guide pipe 470 and smoothly supplying the external air. In the bottom of the air circulation adjuster 400, the inhale/exhaust pipe 430 is provided for inhaling and exhausting air. The inhale/exhaust pipe 430 is designed to have a diameter corresponding to about 30% of that of the air inlet pipe 460. Additionally, the air purifying filter 440 is detachably coupled to the end part of the inhale/exhaust pipe 430, thereby not only introducing fresh air but also preventing an offensive odor due to malfunction from exhaust.

The air passed through the air circulation adjuster 400 is reintroduced into the hopper 110 of the reaction vessel 100 along a fourth connection pipe 740, so that the air circulates continuously. Meanwhile, if the operation is performed while repeating the foregoing processes continuously, the wet food garbage introduced into the hopper 110 of the reaction vessel 110 is decomposed and dried without water, thereby decreasing the weight thereof and producing powdered byproducts. From this point of time, the heater 140 of the heating tank 160 used as the heat source in the hopper 110 of the reaction vessel 100 and the air heater 330 of the deodorizer 300 stop operating, and all functions are stopped in sequence after a lapse of a predetermined time.

Then, the stirring impeller 120 is driven to rotate in the reverse direction by the driving motor 130, and thus the inclined piece 124 provided in the stirring wing 122 of the stirring impeller 120 pushes and gathers the powdered byproducts toward the outlet 114 placed in the center of the hopper 110 of the reaction vessel 100. Thus, the powdered byproducts are smoothly discharged through the outlet 114 of the reaction vessel 100, thereby completing a series of operations.

Figure 3:
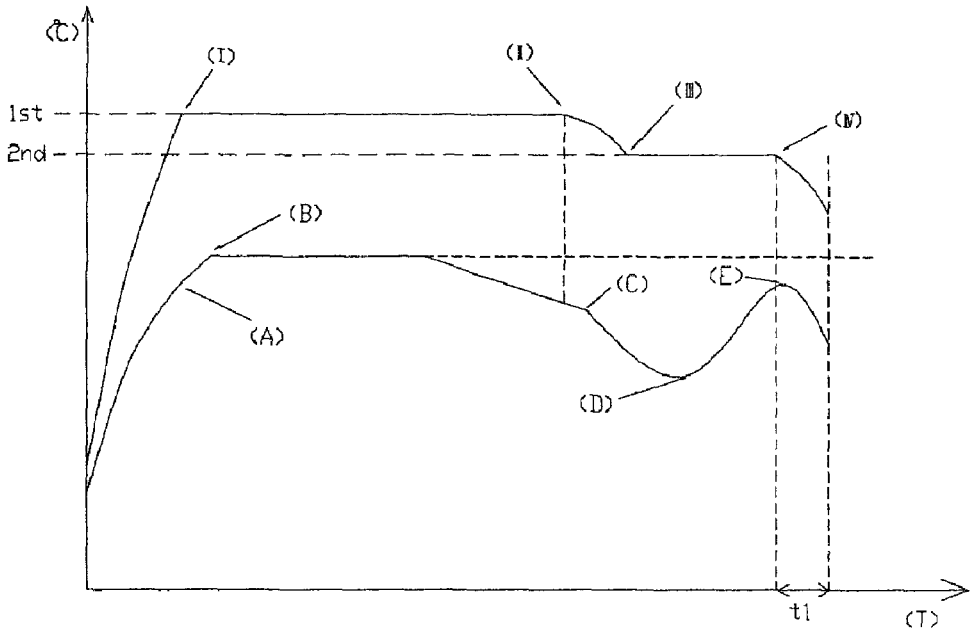
FIG. 3 is a graph showing a temperature change in the food garbage disposer according to an embodiment of the present invention.

Below, a method of controlling temperature in the foregoing food garbage disposer according to an embodiment of the present invention will be described with reference to FIG. 3.

An air temperature sensor 630 is provided on the catalyst tube 320 of the deodorizer 300 and senses a temperature; a hopper temperature sensor 610 is provided in an upper part of the hopper 110 of the reaction vessel 100 and senses an interior temperature of the hopper 110; and a heat-medium oil temperature sensor 620 is provided in the heating tank 160 of the reaction vessel 100 and senses the temperature of the heat-medium oil 150. Such temperature sensors are electrically connected to the controller, so that the controller can controls the respective elements according to sensed temperatures.

The heat-medium oil temperature sensor 620 and the hopper temperature sensor 610 sense the temperature of the heat-medium oil 150 and the interior temperature of the hopper 110, respectively. The food garbage introduced into the hopper 110 is dried by the heated hopper 110 and the introduced hot air, while generating much vapor. The temperature of the heat-medium oil 150 for heating the hopper 110 is controlled to maintain two-stepwise preset temperatures, and the interior temperature of the hopper 110 increases or decreases in the state that the heat-medium oil 150 maintains a constant temperature.

Such a temperature change enables full automation of the food garbage disposer.

The interior temperature of the reaction vessel 100 is set enough to dry and decompose the food garbage introduced into the reaction vessel 100. For example, the interior temperature of the reaction vessel 100 approximates to 80° C., but there is a little difference in the interior temperature as seasons change. Thus, the drying and the decomposition are performed at a temperature of 80° C. or more.

The heater 140 used as the heat source for increasing the temperature of the heat-medium oil 150 is 100% driven at an initial stage. When the heat-medium oil 150 reaches a first setting value (I), the heater 140 is 50% driven. Thus, the heater 140 is repetitively turned on and off, to thereby maintain the first setting value (I-II).

According to the first setting value (I-II) of the heat-medium oil 150, the interior temperature of the hopper 110 reaches a certain temperature (B) and maintains equilibrium of the certain temperature. Thus, a first setting value (A) is set to an operating temperature that is near, i.e., lower by about 2° C.~3° C. than this operating temperature, thereby operating such a temperature control system for the automation.

While the food garbage is dried and decomposed as time goes by, the interior temperature of the hopper 110 maintains the certain temperature (B) but starts lowering continuously as the amount of vapor starts decreasing from a point of time when the water content decreases to about 30%~40% or below even though the heat-medium oil 150 supplies heat constantly. Thus, the interior temperature of the hopper 110 decreases via a point of time C at which it is lower by about 7° C.~8° C. than the certain temperature B. Furthermore, the interior temperature of the hopper 110 continues to decrease to the lowest temperature of 15° C. (D).

Such a temperature lowering occurs inside the hopper 110 depending on the amount of vapor, the water content, the introduced waste heat and the amount of air.

As the water content and other various conditions are changed, if the interior temperature of the hopper 110 changes and reaches the point (c), the hopper temperature sensor 610 sends a temperature sensing signal to the controller 600 and the controller 600 sends a warning signal to the heater 140, thereby converting the heater 140 with respect to a second setting value (III). Therefore, the heater 140 is controlled to lower its operation level and to maintain a stable temperature, i.e., the setting temperature (III) that is lower by 20° C. 30° C. than a first-peak setting temperature.

As described above, the temperature of the heat-medium oil 150 for heating the hopper 110 of the reaction vessel 100 is adjusted corresponding to the interior temperature change of the hopper 110. At the initial stage, the first setting value (I) corresponding to a high temperature is maintained to quickly decompose the food garbage having a high water content. If the water content of the food garbage is lowered, the second setting value (III) is maintained to prevent the food garbage from being carbonized during the operation and to completely perform the drying and the decomposition with the supply of stable thermal energy.

As the operation time elapses, if the water content of the food garbage becomes less than 10% and then water is completely removed from the food garbage, thermal energy supplied to the inside of the hopper 110 increases the interior temperature of the hopper 110 without loss. Accordingly, the interior temperature of the hopper 110 starts increasing again from the lowest point (D). At this time, if the hopper temperature sensor 610 senses a temperature (E) that is higher than the temperature (C) but lower than the temperature (B) and sends the temperature sensing signal to the controller 600, the controller 600 recognizes that the drying and the decomposition of the food garbage is completed, and stops the heater 140 of the hopper 110 and the air heater 330 of the deodorizer 300 (IV). Thus, as the heat source is cut off, the temperature of the heat-medium oil 150 decreases, so that the interior temperature of the hopper 110 increases a little after passing by the point (E) and decreases again.

Then, the total system being in the process undergoes air circulation for a predetermined input time <t1>, so that hot air is discharged. Thereafter, all operations are stopped, thereby completing the processes.

As described above, the present invention provides a food garbage disposer which can separate water vapor into water and air through a condenser while continuously discharging and circulating the water vapor produced when treating food garbage; save energy by utilizing waste heat generated in deodorization; have high durability with an environment-friendly structure that does not emit any offensive odor; and have the maximum efficiency due to full automation.

As apparent from the above description, a food garbage disposer is improved in not only preventing an offensive odor from generating since condensed water produced in a condenser is utilized for filtering vapor discharged out of a reaction vessel, but also automating a full operation thereof since temperature of the reaction vessel is automatically controlled to facilitate drying and decomposition of food garbage.

Although the present invention has been described with reference to the embodiments and the accompanying drawings, it is not limited to the embodiments and the drawings. It should be understood that various modifications and changes can be made by those skilled in the art without departing from the spirit and scope of the present invention defined by the accompanying claims.

What is claimed is:

1. A food garbage disposer comprising:

a reaction vessel which comprises a hopper into which food garbage is introduced, a heating tank [filed] *filled* with heat-medium oil to heat the hopper, and at least one heater to heat the heat-medium oil in the hopper;

an automatic filter which comprises an automatic injection nozzle and filters vapor discharged from the reaction vessel;

a condenser which condenses the vapor passed through the automatic filter and [separate] *separates* the vapor into condensed water and air;

a condensed-water purifier which purifies the condensed water produced by the condenser and supplies the purified water to the automatic injection nozzle of the automatic filter;

a deodorizer which purifies and deodorizes the air produced by the condenser; and an air circulation adjuster which mixes the air passed through the deodorizer with external air and reintroduces the mixed [water] *air* into the reaction vessel.

2. The food garbage disposer according to claim 1, further comprising a controller which controls the heater according to a temperature change inside the hopper so that temperature of the heat-medium oil is adjusted to facilitate drying and decomposition of the food garbage.

3. The food garbage disposer according to claim 1, wherein the reaction vessel comprises a hopper temperature sensor to sense temperature inside the hopper; and a heat-medium oil temperature sensor to sense temperature of the heat-medium oil.

4. The food garbage disposer according to claim 1, wherein the deodorizer comprises a heat supply tube and a catalyst tube, the heat supply tube being mounted while penetrating the heating tank.

5. The food garbage disposer according to claim 1, wherein the condenser comprises a plurality of cooling pipes and at least one cooling fan to cool the plurality of cooling pipes.

6. The food garbage disposer according to claim 4, wherein the cooling pipe comprises at least one lattice contact mesh placed therein, and a coil-shaped aluminum pin attached to an outer circumference thereof.

7. The food garbage disposer according to claim 1, further comprising a rotary stirring impeller placed inside the hopper of the reaction vessel and stirring the food garbage.

8. The food garbage disposer according to claim 6, wherein the stirring impeller comprises an impeller shaft having one end coupled to a lateral wall of the hopper, and the one end of the impeller shaft is coupled to the lateral wall of the hopper by a plurality of gland packings and a packing cover allowing the gland packing to be adjusted with an adjusting bolt.

9. The food garbage disposer according to claim 8, wherein the one end of the impeller shaft is provided with an oil-seal to prevent a leakage that may leak from the hopper from being introduced into a bearing for allowing the impeller shaft to rotate, and a falling hole to make the leakage fall down to prevent the leakage from reaching the bearing.

10. The food garbage disposer according to claim 1, wherein the air circulation adjuster comprises:

a rotary wing which is perpendicularly attached to assist air circulation;

a check valve which is placed above the rotary wing and prevents the vapor produced in the reaction vessel from flowing backward;

a rotation guide structure which reintroduces the air produced from the deodorizer into the reaction vessel;

an inhale/exhaust pipe which is coupled to a bottom of the air circulation adjuster and through which air is inhaled and exhausted; and an air purifying filter which is detachably coupled to an end part of the inhale/exhaust pipe.

11. The food garbage disposer according to claim 1, wherein the automatic filter comprises:

a filtering box through which the vapor discharged from the reaction vessel passes;

a filter which filters the vapor passed through the filtering box; and a gear pump which is provided for injecting the condensed water through the automatic injection nozzle.

12. The food garbage disposer according to claim 6, wherein the condensed-water purifier comprises:

a condensed-water storage tank to store the condensed water produced by the condenser;

a drainpipe to drain out the condensed water produced by the condenser to the condensed-water storage tank; and a condensed-water filter layer to filter the condensed water.

13. The food garbage disposer according to claim 12, wherein the condensed-water purifier further comprises an auxiliary tank to store a predetermined amount of condensed water passed through the condensed-water filter layer.

14. The food garbage disposer according to claim 13, wherein the condensed-water purifier further comprises a discharge pipe that communicates with the auxiliary tank so that the condensed water stored in the auxiliary tank is partially discharged to an outside when water in the auxiliary tank is beyond a predetermined level.

15. The food garbage disposer according to claim 1, wherein the condensed-water purifier comprises:

a condensed-water storage tank to store the condensed water produced by the condenser;

a drainpipe to drain out the condensed water produced by the condenser to the condensed-water storage tank; and a condensed-water filter layer to filter the condensed water.

16. The food garbage disposer according to claim 15, wherein the condensed-water purifier further comprises an auxiliary tank to store a predetermined amount of condensed water passed through the condensed-water filter layer.

17. The food garbage disposer according to claim 15, wherein the condensed-water purifier further comprises a discharge pipe that communicates with the auxiliary tank so that the condensed water stored in the auxiliary tank is partially discharged to an outside when air in the auxiliary tank is beyond a predetermined level.

*18. A food garbage disposer comprising:*

*a reaction vessel comprising a hopper configured to receive food garbage, a heating tank, and at least one heater configured to heat the heating tank and the hopper;*

*an automatic filter comprising an automatic injection nozzle and configured to filter vapor discharged from the reaction vessel;*

*a condenser configured to condense the vapor passed through the automatic filter and to separate the vapor into condensed water and air;*

*a deodorizer configured to purify and deodorize the air produced by the condenser; and*

*an air circulation adjuster configured to mix the air passed through the deodorizer with external air and to reintroduce the mixed air into the reaction vessel.*

*19. The food garbage disposer according to claim 18, wherein the deodorizer comprises a heat supply tube and a catalyst tube, the heat supply tube being mounted while penetrating the heating tank.*

*20. The food garbage disposer according to claim 18, wherein the condenser comprises a plurality of cooling pipes and at least one cooling fan to cool the plurality of cooling pipes.*

* * * * *